United States Patent
Fu et al.

(10) Patent No.: US 8,384,863 B2
(45) Date of Patent: Feb. 26, 2013

(54) LIQUID CRYSTAL DISPLAY SCREEN HAVING CARBON NANOTUBES

(75) Inventors: Wei-Qi Fu, Beijing (CN); Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 196 days.

(21) Appl. No.: 12/313,415

(22) Filed: Nov. 20, 2008

(65) Prior Publication Data

US 2009/0225265 A1    Sep. 10, 2009

(30) Foreign Application Priority Data

Mar. 7, 2008    (CN) .......................... 2008 1 0065794

(51) Int. Cl.
  *G02F 1/1337*    (2006.01)
  *C09K 19/00*    (2006.01)
(52) U.S. Cl. ......... 349/123; 349/128; 349/129; 428/1.2; 977/742; 977/750; 977/752
(58) Field of Classification Search .................. 349/128, 349/123, 129; 428/1.2; 977/742, 750, 752
See application file for complete search history.

(56) References Cited

U.S. PATENT DOCUMENTS

| | | | |
|---|---|---|---|
| 7,045,108 B2 | 5/2006 | Jiang et al. | |
| 7,794,639 B2 | 9/2010 | Huang et al. | |
| 2003/0151344 A1* | 8/2003 | Cheng et al. | 313/311 |
| 2004/0047038 A1 | 3/2004 | Jiang et al. | |
| 2004/0053780 A1* | 3/2004 | Jiang et al. | 502/182 |
| 2005/0007648 A1 | 1/2005 | Wu et al. | |
| 2005/0184642 A1* | 8/2005 | Oh et al. | 313/495 |
| 2006/0113510 A1* | 6/2006 | Luo et al. | 252/500 |
| 2007/0040973 A1* | 2/2007 | Lee et al. | 349/124 |
| 2007/0115413 A1* | 5/2007 | Liu et al. | 349/123 |

(Continued)

FOREIGN PATENT DOCUMENTS

| | | |
|---|---|---|
| CN | 1483667 A | 3/2004 |
| CN | 1781034 | 5/2006 |

(Continued)

OTHER PUBLICATIONS

Fan et al., Explorations on growth mechanism, controlled synthesis and applications of carbon nanotubes, Physics, vol. 35, No. 5, pp. 376-381, (2006).

(Continued)

*Primary Examiner* — Lauren Nguyen
(74) *Attorney, Agent, or Firm* — Altis Law Group, Inc.

(57) ABSTRACT

A liquid crystal display screen includes a first electrode plate, a first alignment layer, a liquid crystal layer, a second alignment layer, and a second electrode plate opposite to the first electrode plate. The liquid crystal layer is sandwiched between the first electrode plate and the second electrode plate. The first alignment layer and the second alignment layer are respectively disposed on the first electrode plate and the second electrode plate, and face the liquid crystal layer. The first alignment layer and the second alignment layer respectively include a plurality of parallel first grooves and second grooves perpendicular to the first grooves formed thereon facing the liquid crystal layer. Furthermore, the first alignment layer and the second alignment layer respectively include a plurality of parallel and spaced carbon nanotube structures.

18 Claims, 6 Drawing Sheets

U.S. PATENT DOCUMENTS

| | | | |
|---|---|---|---|
| 2007/0116916 A1 | 5/2007 | Ito et al. | |
| 2007/0246689 A1* | 10/2007 | Ge et al. | 252/500 |
| 2007/0296897 A1 | 12/2007 | Liu et al. | |
| 2009/0073363 A1 | 3/2009 | Fu et al. | |
| 2009/0225264 A1* | 9/2009 | Fu et al. | 349/128 |
| 2009/0272935 A1 | 11/2009 | Hata et al. | |

FOREIGN PATENT DOCUMENTS

| | | |
|---|---|---|
| CN | 1955819 A | 5/2007 |
| CN | 1979948 | 6/2007 |
| JP | 2002-250909 | 9/2002 |
| JP | 2004-102217 | 4/2004 |
| JP | 2004-107196 | 4/2004 |
| JP | 2004-348121 | 12/2004 |
| JP | 2007-122057 | 5/2007 |
| JP | 2007-182352 | 7/2007 |
| JP | 2007-314776 | 12/2007 |
| JP | 2008-3606 | 1/2008 |
| TW | 200417510 | 3/1992 |
| TW | 200941094 | 3/1997 |
| TW | I228605 | 3/2005 |
| TW | I255487 | 5/2006 |
| TW | 200621631 | 7/2006 |
| TW | 200938917 | 9/2009 |

OTHER PUBLICATIONS

Xiang lin Liu, Physics New Knowledge. Physics bimonthly journal, vol. 27, No. 5, pp. 720-721, (2005).

* cited by examiner

LIQUID CRYSTAL DISPLAY SCREEN HAVING CARBON NANOTUBES

RELATED APPLICATIONS

This application is related to commonly-assigned applications entitled "LIQUID CRYSTAL DISPLAY SCREEN", filed on 2008 Nov. 20, (application Ser. No. 12/313,452); "LIQUID CRYSTAL DISPLAY SCREEN", filed on 2008 Nov. 20, (application Ser. No. 12/313,394); "METHOD FOR MAKING LIQUID CRYSTAL DISPLAY SCREEN", filed on 2008 Nov. 20, (application Ser. No. 12/313,450); "LIQUID CRYSTAL DISPLAY SCREEN", filed on 2008 Nov. 20, (application Ser. No. 12/313,393); "LIQUID CRYSTAL DISPLAY SCREEN", filed on 2008 Nov. 20, (application Ser. No. 12/313,440); and "METHOD FOR MAKING LIQUID CRYSTAL DISPLAY SCREEN", filed on 2008 Nov. 20, (application Ser. No. 12/313,414). The disclosures of the above-identified applications are incorporated herein by reference.

BACKGROUND

1. Field of the Invention

The present invention relates to liquid crystal display screens and, particularly, to a carbon-nanotube-based liquid crystal display screen.

2. Discussion of Related Art

Figure 6:
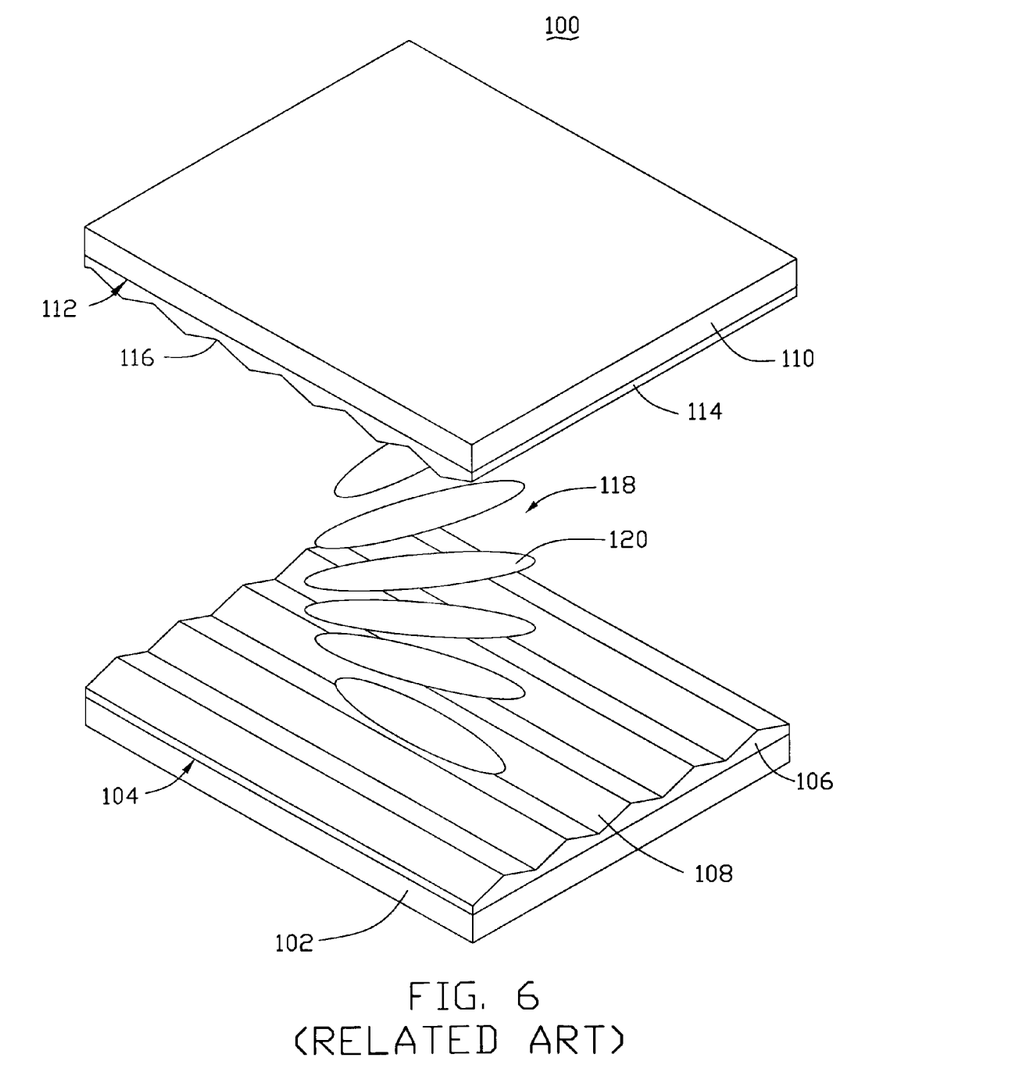
FIG. 6 is a schematic, isometric view of a conventional liquid crystal display screen according to the prior art.

Referring to FIG. 6, a conventional liquid crystal display screen 100, according to the prior art, for a liquid crystal display (LCD) generally includes a first electrode plate 104, a second electrode plate 112, and a liquid crystal layer 118. The first electrode plate 104 is disposed parallel to the second electrode plate 112. The liquid crystal layer 118 is located between the first electrode plate 104 and the second electrode plate 112. A first transparent electrode layer 106 and a first alignment layer 108 are formed in that order on an inner surface of the first electrode plate 104 that faces toward the liquid crystal layer 118. A first polarizer 102 is formed on an outer surface of the first electrode plate 104 that faces away from the liquid crystal layer 118. A second transparent electrode layer 114 and a second alignment layer 116 are formed in that order on an inner surface of the second electrode plate 112 that faces toward the liquid crystal layer 118. A second polarizer 110 is formed on an outer surface of the second electrode plate 112 that faces away from the liquid crystal layer 118.

The quality and performance of the alignment layers 108, 116 are key factors that determine the display quality of the liquid crystal display screen 100. A high quality liquid crystal display screen demands steady and uniform arrangement of liquid crystal molecules 1182 of the liquid crystal layer 118. This is achieved in part by correct arrangement of the liquid crystal molecules 1182 at the alignment layers 108, 116. Materials to make the alignment layers 108, 116 are typically selected from the group consisting of polystyrene, polystyrene derivative, polyimide, polyvinyl alcohol, epoxy resin, polyamine resin, and polysiloxane. The selected material is manufactured into a preform of each alignment layer 108, 116. The preform is then treated by one method selected from the group consisting of rubbing, incline silicon oxide evaporation, and atomic beam alignment micro-treatment. Thereby, grooves are formed on the treated surface of the preform, and the alignment layer 108, 116 is obtained. The grooves affect the arrangement and orientations of the liquid crystal molecules 1182 thereat.

In the liquid crystal display screen 100, the liquid crystal molecules 1182 are cigar-shaped. A plurality of parallel first grooves 1082 is formed at an inner surface of the first alignment layer 108. A plurality of parallel second grooves 1162 is formed at an inner surface of the second alignment layer 116. A direction of alignment of each of the first grooves 1082 is perpendicular to a direction of alignment of each of the second grooves 1162. The grooves 1082, 1162 function so as to align the orientation of the liquid crystal molecules 1182 thereat. In particular, the liquid crystal molecules 1182 adjacent to the alignment layers 108, 116 are aligned parallel to the grooves 1082, 1162 respectively. When the grooves 1082 and 1162 are at right angles and the electrode plates 104 and 112 are spaced an appropriate distance from each other, the liquid crystal molecules 1182 can automatically twist progressively over a range of 90 degrees from the top of the liquid crystal layer 118 to the bottom of the liquid crystal layer 118.

The polarizers 102 and 110 and the transparent electrode layers 106 and 114 play important roles in the liquid crystal display screen 100. However, the polarizers 102 and 110 and the transparent electrode layers 106 and 114 may make the liquid crystal display screen 100 unduly thick, and may reduce the transparency of the liquid crystal display screen 100. Moreover, the polarizers 102 and 110 and the transparent electrode layers 106 and 114 typically increase the cost of manufacturing the liquid crystal display screen 100.

Furthermore, in order for the liquid crystal display screen 100 to have a multi-pixel display function, the second transparent electrode layer 114 can be a common electrode layer, and the first transparent electrode layer has a plurality of row electrodes and column electrodes. Due to the row electrodes and column electrodes being perpendicular to each other, multiple display units (pixel electrodes) are formed on the first transparent electrode 106. Through the control and alternation of the voltage from each pixel electrode by the row electrodes and column electrodes, the optical rotation of the liquid crystal molecules between the pixel electrode and the common electrode layer will be altered. Each of the liquid crystal molecules functions as a light valve. Thus, each pixel electrode is a pixel. However, the structure of the liquid crystal display screen 100 is complex.

What is needed, therefore, is to provide a thin liquid crystal display screen with a simple structure, high-quality liquid crystal molecules, and a multi-pixel display function.

BRIEF DESCRIPTION OF THE DRAWINGS

Many aspects of the present liquid crystal display screen can be better understood with reference to the following drawings. The components in the drawings are not necessarily drawn to scale, the emphasis instead being placed upon clearly illustrating the principles of the present liquid crystal display screen.

Corresponding reference characters indicate corresponding parts throughout the several views. The exemplifications set out herein illustrate at least one embodiment of the present liquid crystal display screen, in at least one form, and such exemplifications are not to be construed as limiting the scope of the invention in any manner.

DETAILED DESCRIPTION OF EXEMPLARY EMBODIMENTS

References will now be made to the drawings to describe, in detail, various embodiments of the present liquid crystal display screen.

Figure 1:
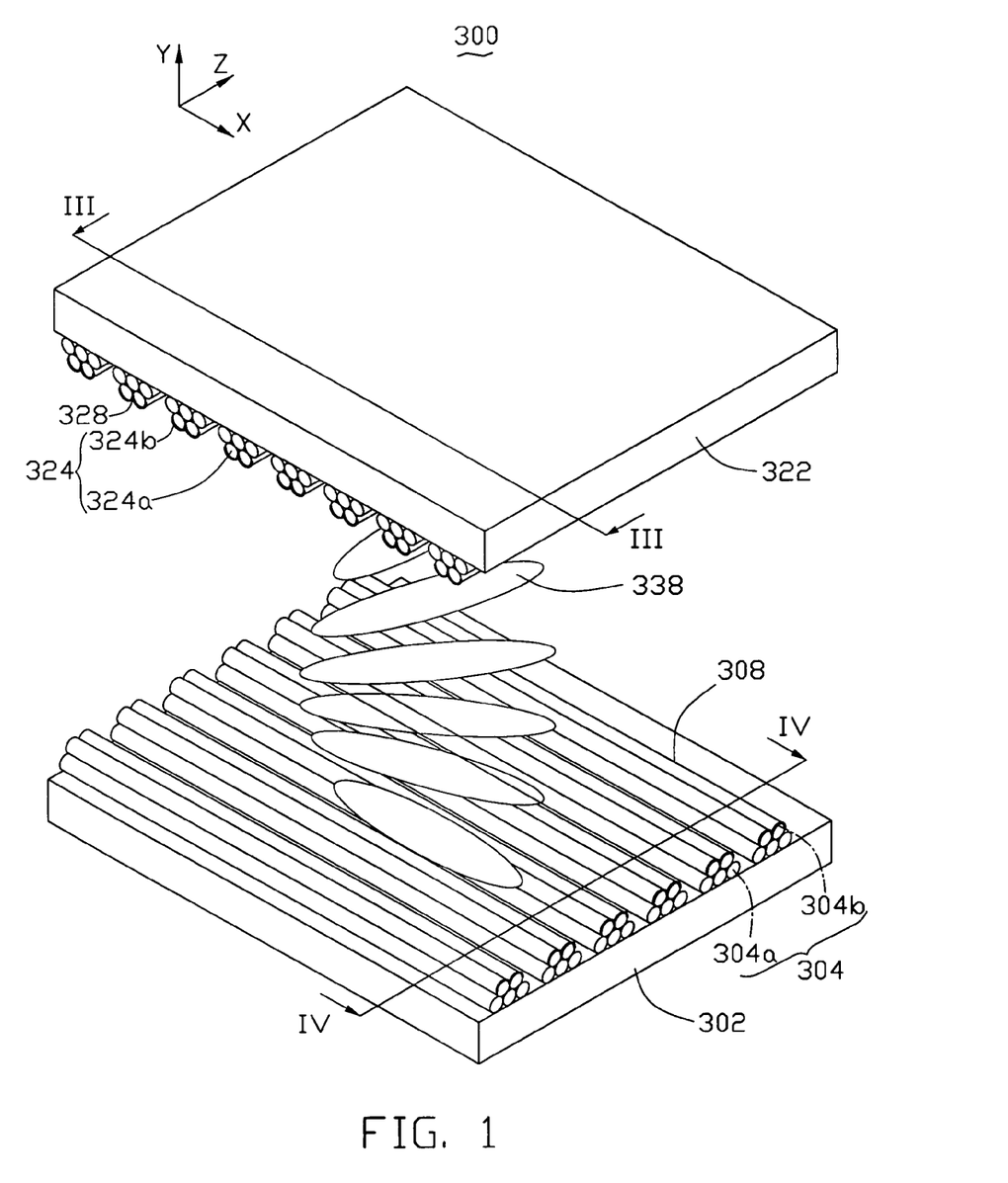
FIG. 1 is a schematic, isometric view of a present liquid crystal display screen, in accordance with a present embodiment with a representation of the carbon nanotube wires.
Figure 2:
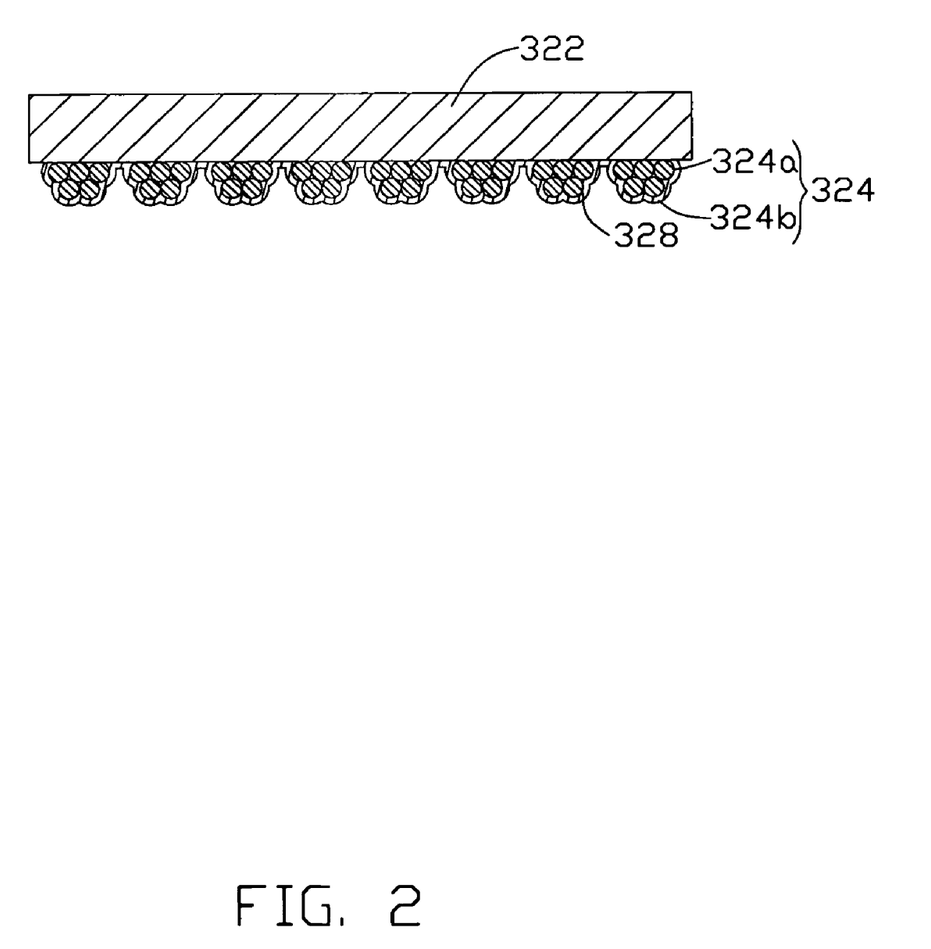
FIG. 2 is a cross-sectional schematic view of the liquid crystal display screen of the present embodiment, taken along a line III-III of FIG. 1.
Figure 3:
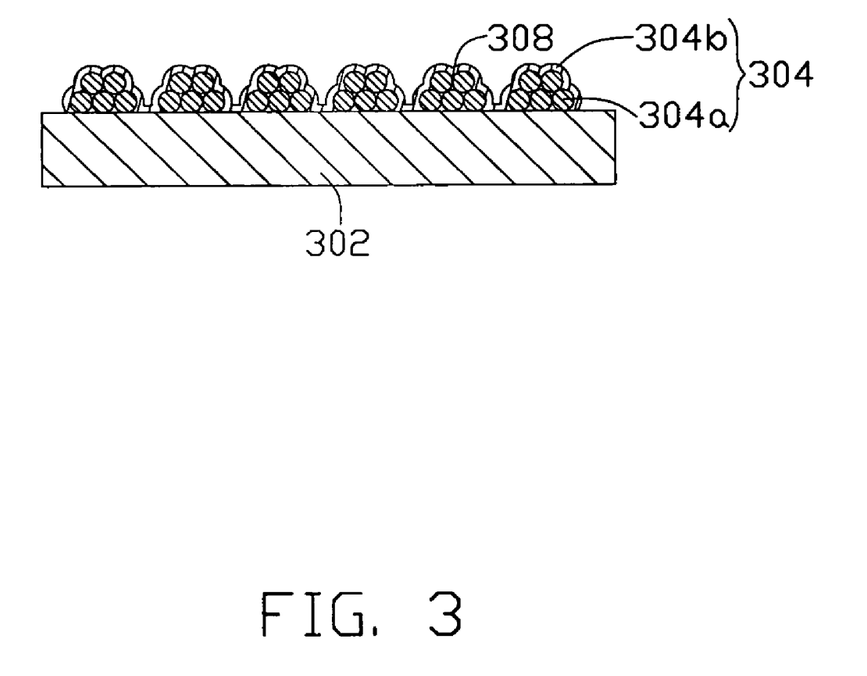
FIG. 3 is a cross-sectional schematic view of the liquid crystal display screen of the present embodiment, taken along a line IV-IV of FIG. 1.

Referring to FIGS. 1, 2, and 3, a liquid crystal display screen 300 includes a first electrode plate 302, a first alignment layer 304, a liquid crystal layer 338, a second alignment layer 324, and a second electrode plate 322. The first electrode plate 302 is opposite to the second electrode plate 322. The liquid crystal layer 338 is sandwiched between the first electrode plate 302 and the second electrode plate 322. The first alignment layer 304 is disposed on the first electrode plate 302 adjacent to the liquid crystal layer 338. The first alignment layer 304 includes a plurality of parallel first grooves 308 formed thereat facing the liquid crystal layer 338. The second alignment layer 324 is disposed on the second electrode plate 322 adjacent to the liquid crystal layer 338. The second alignment layer 324 includes a plurality of parallel second grooves 328 formed thereon facing the liquid crystal layer 338. An alignment direction of the first grooves 308 is perpendicular to an alignment direction of the second grooves 328.

The materials that make up the first electrode plate 302 and the second electrode plate 322 are selected from the group consisting of glass, quartz, diamond, and plastics. In the present embodiment, the first electrode plate 302 and the second electrode plate 322 are made of flexible materials, such as cellulose triacetate (CTA). Based on user-specific needs, the first electrode plate 302 and the second electrode plate 322 can be respectively made of different materials, as described above.

The liquid crystal layer 338 includes a plurality of cigar-shaped liquid crystal molecules. The liquid crystal layer 338 can also be made of other liquid crystal materials, which are generally used in the present technology.

The first alignment layer 304 includes a plurality of parallel and spaced first carbon nanotube structures 304*a*. The second alignment layer 324 includes a plurality of parallel and spaced second carbon nanotube structures 324*a*. Each carbon nanotube structure can include a grouping of carbon nanotube wires as show in FIG. 1, one or more carbon nanotube films (not shown) or at least two stacked films (not shown). The first carbon nanotube structures 304*a* in the first alignment layer 304 are perpendicular to the second carbon nanotube structures 324*a* in the second alignment layer 324.

In the present embodiment, each carbon nanotube structures include a grouping of carbon nanotube wires. The carbon nanotube structure includes a plurality of parallel carbon nanotube wires. The cross section of the carbon nanotube structure can be a truncated pyramid like shape. Each carbon nanotube wire includes a plurality of successively oriented carbon nanotubes joined end-to-end by van der Waals attractive force. Each carbon nanotube wire can also include a plurality of successively twisted carbon nanotube segments joined end-to-end by van der Waals attractive force.

In certain embodiments, the carbon nanotube structures include a carbon nanotube film. Each carbon nanotube film includes a plurality of carbon nanotubes oriented along one direction, which is parallel to the longest side of the carbon nanotube structures. Specifically, each given carbon nanotube film includes a plurality of successively oriented carbon nanotube segments joined end-to-end by van der Waals attractive force. Furthermore, each carbon nanotube segment has a plurality of carbon nanotubes. The carbon nanotubes are parallel to each other. Adjacent carbon nanotubes are attracted by van der Waals attractive force.

In other embodiments, the carbon nanotube structures include at least two stacked carbon nanotube films. Each carbon nanotube film includes a plurality of carbon nanotubes oriented along one direction. An angle between the aligned directions of the carbon nanotubes in any two adjacent carbon nanotube layers equal to 0°.

The thickness of the first alignment layer 304 and/or the second alignment layer 324 is in a range from 20 nanometers to 5 micrometers. The carbon nanotubes can be single-walled carbon nanotubes, double-walled carbon nanotubes, or multi-walled carbon nanotubes. Diameters of the single-walled carbon nanotubes approximately range from 0.5 to 10 nanometers. Diameters of the double-walled carbon nanotubes approximately range from 1 to 50 nanometers. Diameters of the multi-walled carbon nanotubes approximately range from 1.5 to 50 nanometers.

The width and thickness of the carbon nanotube structures are not limited. In the present embodiment, the width of the carbon nanotube structures ranges from 0.1 to 10 millimeters. The thickness of the carbon nanotube structures ranges from 20 nanometers to 1 micrometer. The spacing between two adjacent carbon nanotube structures ranges from 50 to 150 micrometers. The carbon nanotube wires, carbon nanotube segments, and/or carbon nanotubes arranged in parallel define a plurality of parallel gaps, which are used as the first grooves 308 and/or the second grooves 328 to align the liquid crystal molecules.

A fixing layer is disposed on the carbon nanotube structures of the first alignment layer 304 or the second alignment layer 324 facing the liquid crystal layer 338. The materials of the fixing layer are selected from diamonds, silicon nitrogen, hydride of random silicon, silicon carbon, silicon dioxide, aluminum oxide, tin oxide, cerium oxide, zinc titanate, and indium titanate. The fixing layer can be fabricated by means of evaporating, sputtering, or plasma enhanced chemical vapor deposition. The materials of the fixing layer are selected from polyethylene ethanol, polyamide, polymethyl methacrylate, and polycarbonate. As a result, the fixing layers can be sprayed on the corresponding carbon nanotube structures. A thickness of the fixing layer approximately ranges from 20 nanometers to 2 micrometers.

In the present embodiment, the first alignment layer 304 includes a plurality of first carbon nanotube structures 304*a* that are separated and parallel to each other, along with a first fixing layer 304 *b*; and the second alignment layer 324 include a plurality of second carbon nanotube structures 324*a* that are separated and parallel to each other, along with and a second fixing layer 324*b*. Due to the carbon nanotube structures 304*a* and 324*a* having a plurality of parallel and uniform gaps, when the first fixing layer 304*b* and the second fixing layer 324*b* are correspondingly formed on the first carbon nanotube structures 304*a* and the second carbon nanotube structures 324*a*, the first grooves 308 and the second grooves 328 are accordingly formed on surfaces of the first fixing layer 304*b* and the second fixing layer 324*b*.

One way to ensure that the first grooves 308 are perpendicular the second grooves 328 is to align the carbon nanotubes in the first alignment layer 304 perpendicular to the carbon nanotubes in second alignment layer 324. Specifically, the carbon nanotubes in the first alignment layer 304 are each aligned parallel to X-axis, and that of the second alignment layer 324 are each aligned parallel to Z-axis. Thus, the first carbon nanotube structures 304a and the second carbon nanotube structures 324a overlap, but do not touch, thereby forming a pixel. The first alignment layer 304 and the second alignment layer 324 can align liquid crystal molecules among the overlapped area of the pixel. Due to the first alignment layer 304 and the second alignment layer 324 having a plurality of carbon nanotube structures, a plurality of pixels are also formed.

Since the carbon nanotube structures has a high tensile strength, if the first electrode plate 302 and the second electrode plate 322 are made of flexible materials, the liquid crystal display screen 300 can be flexible. Moreover, carbon nanotubes provide each carbon nanotube layer with good electrical conductivity. Thus, each carbon nanotube layer can be used to conduct electricity, and thereby replace a conventional transparent electrode layer, i.e., the carbon nanotube layer acting as both the alignment and electrode layers. This simplifies the structure and reduces the thickness of the liquid crystal display screen 300, and enhances the efficiency of usage of an associated backlight.

Furthermore, by overlapping a fixing layer on the carbon nanotube layer, this prevents the carbon nanotube layer of the alignment layer from falling off when it comes in contact with the liquid crystal layer.

Because the carbon nanotubes in each carbon nanotube layer are arranged in parallel, the carbon nanotube layer has a light polarization characteristic and, thus, can be used to replace a conventional polarizer. However, at least one polarizer can be disposed on a surface of the first electrode plate 302 that faces away from the liquid crystal layer 338, and/or on a surface of the second electrode plate 322 that faces away from the liquid crystal layer 338.

Figure 4:
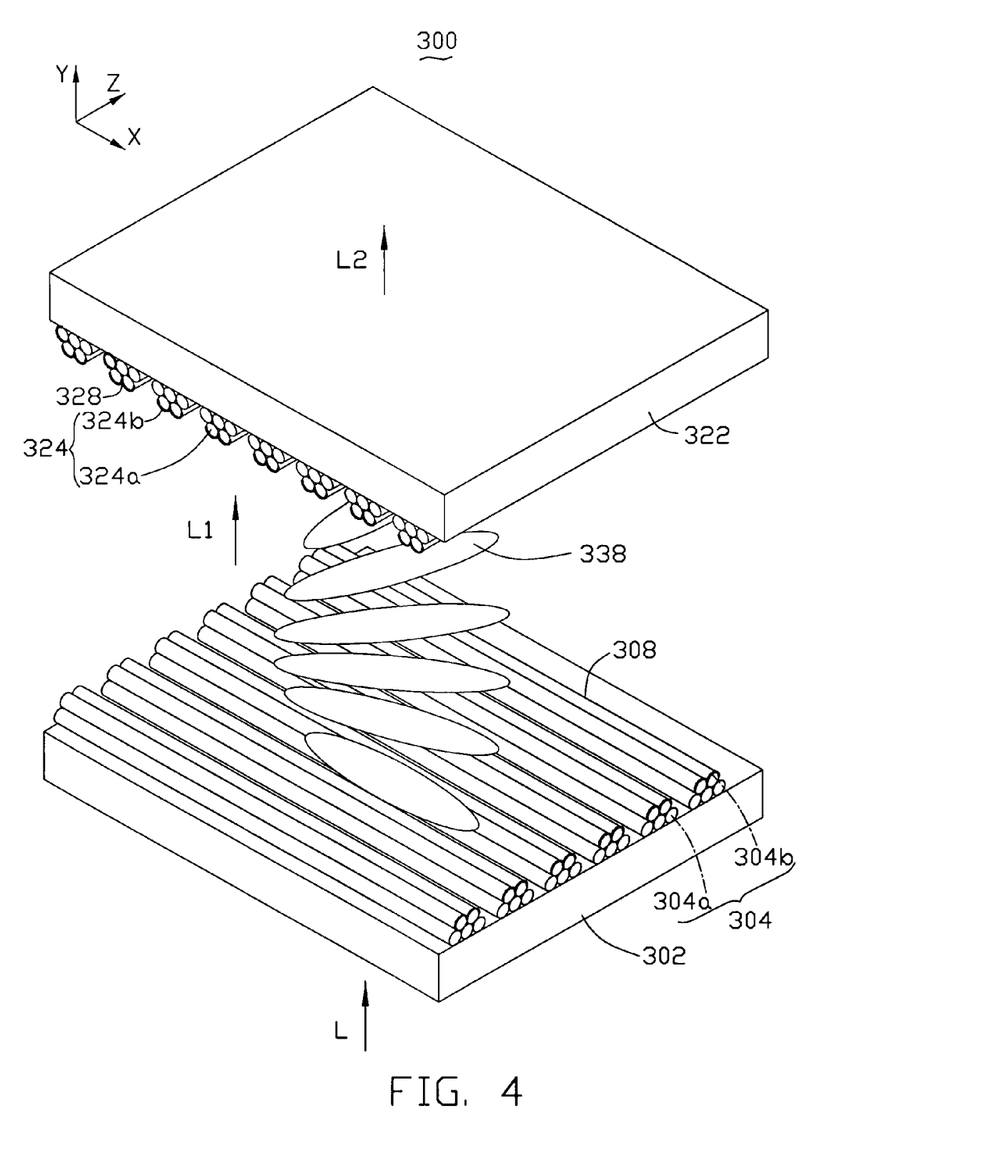
FIG. 4 is similar to FIG. 1, showing the liquid crystal display screen in a light transmitting state.

Referring to FIG. 4, when no voltage is applied to a pixel of the alignment layers 304 and 324, the arrangement of the liquid crystal molecules is in accordance with the alignment directions of the alignment layers 304 and 324. In this embodiment, the alignment directions of the alignment layers 304 and 324 are at right angles, so the liquid crystal molecules can automatically oriented so that they turn a total of 90 degrees from a top of the liquid crystal layer 338 to a bottom of the liquid crystal layer 338. When light L is shone upon the first alignment layer 304, because a transmission axis 309 of the first alignment layer 304 is along the direction of the z-axis, only polarization light L1 with a polarization direction parallel to the transmission axis 309 can pass through the first alignment layer 304. When the polarization light L1 passes through the liquid crystal molecules, and because the liquid crystal molecules turn 90 degrees from bottom to top, the polarization direction of the polarization light L1 is also turned 90 degrees and becomes polarization light L2 which is parallel to the direction of the x-axis. The polarization light L2 passing through the liquid crystal molecules can pass through the second alignment layer 324 because a transmission axis 329 of the second alignment layer 324 is along the direction of the x-axis. As a result, the liquid crystal display screen 300 transmits light.

Figure 5:
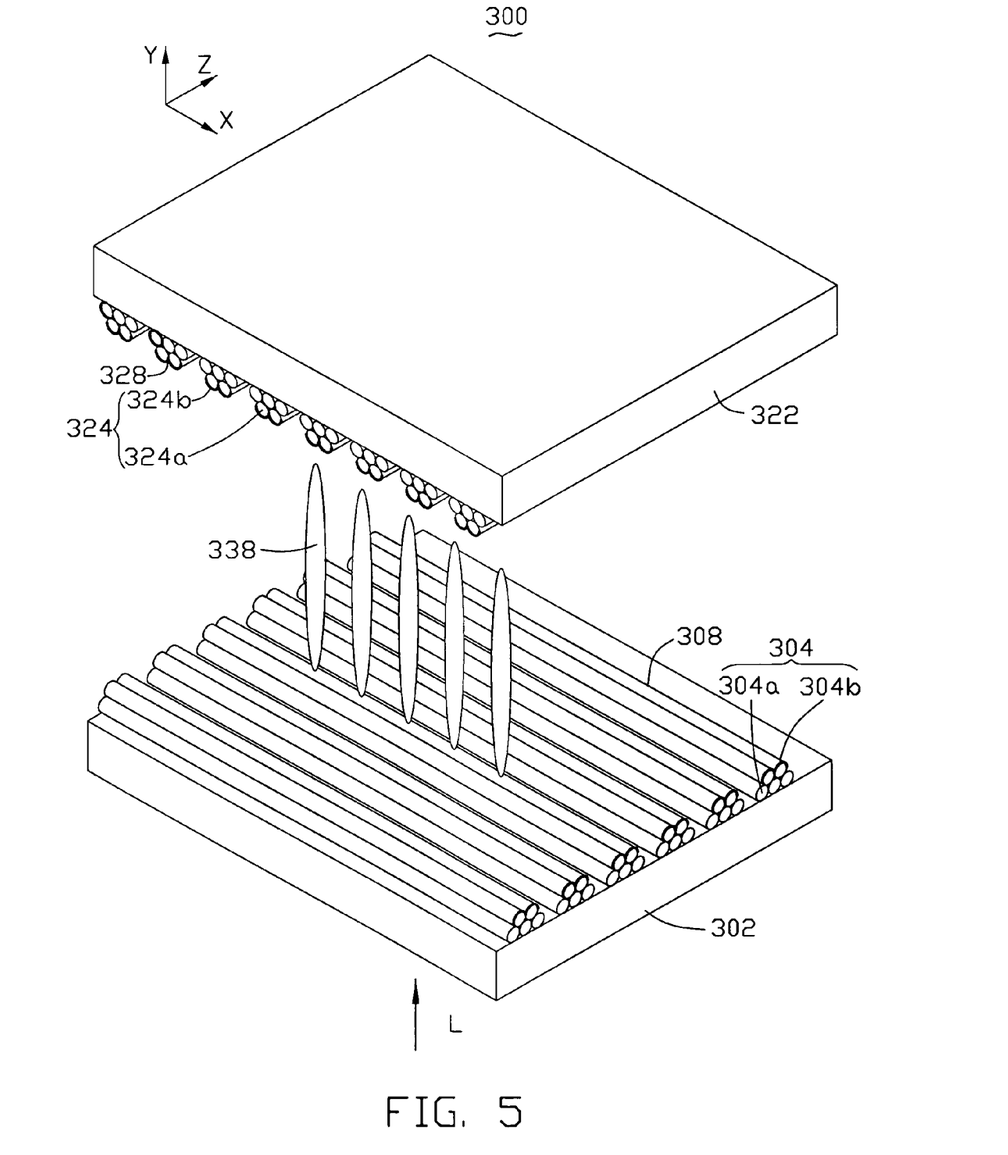
FIG. 5 is similar to FIG. 1, showing the liquid crystal display screen in a light blocking state.

Referring to FIG. 5, when a voltage is applied to a pixel of the alignment layers 304 and 324, an electrical field perpendicular to the alignment layers 304 and 324 are formed. Under the influence of the electrical field, the liquid crystal molecules orient to become parallel to the direction of the electrical field. Accordingly, the polarization light L1 passing through the liquid crystal molecules keeps its polarization direction along the Z-axis and therefore cannot pass through the second alignment layer 324. As a result, the liquid crystal display screen 300 blocks light.

The present liquid crystal display screen 300 has at least the following advantages. Firstly, each carbon nanotube structures have a plurality of carbon nanotubes, therefore the carbon nanotube layer has good electrical conductivity. As a result, the carbon nanotube layer can be used to conduct electricity and replace the conventional transparent electrode layer, i.e., the carbon nanotube layer acting as both the alignment and electrode layers. This simplifies the structure and reduces the thickness of the liquid crystal display screen 300, and enhances the efficiency of an associated backlight. Secondly, the carbon nanotube structures have a plurality of parallel gaps, which can be used to align the liquid crystal molecules. Therefore, the carbon nanotube structures can be directly used as the alignment layer. Thirdly, the alignment layers 304, 324 respectively include a plurality of carbon nanotube structures that are separated and parallel to each other. Moreover, the first alignment layer 304 is perpendicular to the second alignment layer 324. Thus, the carbon nanotube structures can act as the row electrodes and the column electrodes, allowing the liquid crystal display screen 300 to be multi-pixel.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A liquid crystal display screen comprising:
a first electrode plate;
a second electrode plate opposite to the first electrode plate;
a liquid crystal layer sandwiched between the first electrode plate and the second electrode plate;
a first alignment layer disposed on the first electrode plate and facing the liquid crystal layer, and comprising a plurality of parallel and spaced carbon nanotube structures isolated from each other, wherein each of the carbon nanotube structures comprises a plurality of carbon nanotubes and defines a plurality of parallel first grooves; and
a second alignment layer disposed on the second electrode plate and facing the liquid crystal layer, and comprising a plurality of parallel and spaced carbon nanotube structures from each other, wherein each of the carbon nanotube structures comprises a plurality of carbon nanotubes and defines a plurality of parallel second grooves, the second grooves are perpendicular to the first grooves.

2. The liquid crystal display screen of claim 1, wherein the carbon nanotube structures in the first alignment layer are perpendicular to the carbon nanotube structures of the second alignment layer.

3. The liquid crystal display screen of claim 1, wherein each carbon nanotube structure comprises a plurality of carbon nanotubes oriented along one direction, the carbon nanotubes in the carbon nanotube structures are selected from a group consisting of single-walled carbon nanotubes, double-walled carbon nanotubes, and multi-walled carbon nanotubes; and a diameter of the single-walled carbon nanotubes ranges from 0.5 nanometers to 50 nanometers, a diameter of the double-walled carbon nanotubes ranges from 1 nanometer to 50 nanometers, and a diameter of the multi-walled carbon nanotube ranges from 1.5 nanometers to 50 nanometers.

4. The liquid crystal display screen of claim 1, wherein each carbon nanotube structure comprises a carbon nanotube film, the carbon nanotube film comprises a plurality of parallel carbon nanotubes.

5. The liquid crystal display screen of claim 4, wherein each carbon nanotube structure comprises at least two stacked carbon nanotube films, and an angle between the aligned directions of the carbon nanotubes in adjacent carbon nanotube layers equal to 0°.

6. The liquid crystal display screen of claim 4, wherein the carbon nanotube film comprises a plurality of successively oriented carbon nanotube segments joined end-to-end by van der Waals attractive force therebetween.

7. The liquid crystal display screen of claim 6, wherein each carbon nanotube segment comprises of a plurality of carbon nanotubes, the carbon nanotubes have a same length and are parallel to each other, and adjacent carbon nanotubes are attracted by van der Waals attractive force therebetween.

8. The liquid crystal display screen of claim 7, wherein a plurality of gaps are defined between the carbon nanotubes.

9. The liquid crystal display screen of claim 1, wherein each carbon nanotube structure comprises a plurality of stacked carbon nanotube wires.

10. The liquid crystal display screen of claim 9, wherein each carbon nanotube wire comprises a plurality carbon nanotubes joined end-to-end by van der Waals attractive force.

11. The liquid crystal display screen of claim 9, wherein each carbon nanotube wire comprises of twisted carbon nanotubes joined end-to-end by van der Waals attractive force.

12. The liquid crystal display screen of claim 9, wherein a plurality of parallel and uniformly distributed gaps are defined between the carbon nanotube wires.

13. The liquid crystal display screen of claim 9, wherein the cross section of the carbon nanotube structure is a truncated pyramid like shape.

14. The liquid crystal display screen of claim 1, wherein the carbon nanotube structures further comprise of a fixing layer, the surface of the fixing layer has a plurality of gaps formed thereon according to the gaps of the carbon nanotube structures, and the gaps of the fixing layer constitute the grooves of the first, second or both first and second layers.

15. The liquid crystal display screen of claim 14, wherein materials of the fixing layer are selected from the diamond, silicon nitrogen, hydride of random silicon, silicon carbon, silicon dioxide, aluminum oxide, tin oxide, cerium oxide, zinc titanate, and indium titanate, polyethylene ethanol, polyamide, polymethyl methacrylate, and polycarbonate.

16. The liquid crystal display screen of claim 14, wherein a thickness of the fixing layer approximately ranges from 20 nanometers to 2 micrometers.

17. The liquid crystal display screen of claim 1, wherein spacing between adjacent carbon nanotube structures ranges from 50 micrometers to 150 micrometers.

18. The liquid crystal display screen of claim 1, wherein the first electrode plate and the second electrode plate are made of flexible and transparent materials, or hard and transparent materials, one of the flexible and transparent materials being cellulose triacetate, and the hard and transparent materials being selected from the group consisting of glass, quartz, diamond, and plastics.

* * * * *